United States Patent [19]

Ufermann et al.

[11] Patent Number: 5,013,229

[45] Date of Patent: May 7, 1991

[54] MAT-MAKING APPARATUS FOR PARTICLEBOARD MANUFACTURE

[75] Inventors: Werner Ufermann, Schwalmtal; Jürgen Kieser, Nettetal, both of Fed. Rep. of Germany

[73] Assignee: G. Siempelkamp GmbH & Co., Krefeld, Fed. Rep. of Germany

[21] Appl. No.: 444,886

[22] Filed: Dec. 1, 1989

[30] Foreign Application Priority Data

Dec. 8, 1988 [DE] Fed. Rep. of Germany ....... 3841276

[51] Int. Cl.⁵ ....................... B29C 43/22; D01G 25/00

[52] U.S. Cl. ..................................... 425/83.1; 19/296; 264/109; 425/182; 425/193; 425/363

[58] Field of Search ...................... 425/83.1, 182, 193, 425/72.2, 363, 80.1; 264/103, 109; 65/9; 19/296

[56] References Cited

U.S. PATENT DOCUMENTS

| | | | |
|---|---|---|---|
| 3,220,812 | 11/1965 | Underwood | 65/9 |
| 3,551,250 | 12/1970 | Paoletti | 65/9 |
| 3,684,416 | 8/1972 | Lenk | 425/72.2 |
| 4,068,991 | 1/1978 | Ufermann et al. | 425/81.1 |
| 4,405,297 | 9/1983 | Appel et al. | 425/72.2 |
| 4,454,940 | 6/1984 | Ufermann | 425/363 |
| 4,650,409 | 3/1987 | Nistri et al. | 425/83.1 |
| 4,820,142 | 4/1989 | Balk | 425/72.2 |

*Primary Examiner*—Jay H. Woo
*Assistant Examiner*—William Matney
*Attorney, Agent, or Firm*—Herbert Dubno; Andrew Wilford

[57] ABSTRACT

An apparatus for forming a particle mat for the production of particleboard has a transport belt having a stretch moving in a longitudinal transport direction and forming a deposition surface in turn defining a floor of a deposition space, a dispenser upwardly delimiting the space and including a dispensing roller for depositing particles as a mat in the space on the longitudinal moving deposition surface, a pair of transversely spaced and longitudinally extending upper guides extending in the space generally at the dispenser, and a pair of transversely spaced and longitudinally extending lower guides extending in the space underneath the respective upper guides and generally at the deposition surface. A pair of longitudinally extending, continuous, and transversely spaced flexible sheets each extend the full longitudinal length of the deposition space and have an inner edge secured to one of the guides of a respective one of the pairs of guides and an outer edge. The sheets each pass around the other of the guides of the respective pair of guides and therefore each have a section extending generally vertically between the respective upper and lower guides. Tensioners engages the outer edges of the sheets and maintains the wall sections taut and generally planar between the respective upper and lower guides. Thus the deposition space is transversely delimited by the sections of the sheets.

8 Claims, 2 Drawing Sheets

MAT-MAKING APPARATUS FOR PARTICLEBOARD MANUFACTURE

FIELD OF THE INVENTION

The present invention relates to the manufacture of particleboard. More particularly this invention concerns an apparatus for forming a particle mat that is pressed into particleboard.

BACKGROUND OF THE INVENTION

Particleboard is made by forming a mat of particles mixed with an appropriate normally heat-activatable binder on a conveyor belt. This mat is prepressed between rollers and then normally subdivided into panels that are hot pressed into finished boards that are trimmed to size for the end user. Equipment for doing this is described in U.S. Pat. Nos. 4,468,188, 4,647,417, 4,645,632, and 4,681,523 as well as in the patents and references cited therein.

The mat-forming apparatus typically comprises a dispensing roller having a plurality of like axially spaced disks carried on a rotating horizontal shaft. A reinforced synthetic-resin conveyor belt has a horizontal upper stretch spaced below this drum and is continuously driven to move this upper stretch longitudinally downstream. Binder-coated particles are fed to the drum and pass through it to land on the conveyor belt and form a mat of uniform thickness that is subsequently processed as described above into a particleboard (which term is here intended to cover chipboard, fiberboard, and similar materials formed of particles that themselves do not extend the full width, thickness, or length of the finished product).

In order to preform the mat and prevent the particles from spilling outside the machine, walls are provided extending longitudinally along each side of the area of the conveyor belt on which the particles are dropped by the dispensing drum. These walls are formed of sheet metal plates. When the mat-forming space is long it is necessary to use a succession of lapped plates. As a result the edge of the mat thus formed is not very neat, in particular when long particles or fibers are being deposited, as the slight change in width where one plate ends and the next one starts can disrupt the fibers at the edge of the mat.

It is also standard to change the overall height of the distributing space, typically by raising or lowering the dispensing rolls, in order to achieve a different effect or to use a different type of particle. When such a height change is made it is therefore necessary to swap out the wall plates altogether with ones having the desired height, so that down time for such a change is substantially increased.

OBJECTS OF THE INVENTION

It is therefore an object of the present invention to provide an improved apparatus for dispensing particles in a mat-forming operation of a particleboard plant.

Another object is the provision of such an improved apparatus for dispensing particles in a mat-forming operation of a particleboard plant which overcomes the above-given disadvantages, that is which ensures that the mat edges will remain uniform and straight and that allows the dispensing-space height to be changed easily.

SUMMARY OF THE INVENTION

An apparatus for forming a particle mat for the production of particleboard comprises a transport belt having a stretch moving in a longitudinal transport direction and forming a deposition surface in turn defining a floor of a deposition space, a dispenser upwardly delimiting the space and including a dispensing roller for depositing particles as a mat in the space on the longitudinally moving deposition surface, a pair of transversely spaced and longitudinally extending upper guides extending in the space generally at the dispenser, and a pair of transversely spaced and longitudinally extending lower guides extending in the space underneath the respective upper guides and generally at the deposition surface. According to this invention a pair of longitudinally extending, continuous, and transversely spaced flexible sheets each extend the full longitudinal length of the deposition space and have an inner edge secured to one of the guides of a respective one of the pairs of guides and an outer edge. The sheets each pass around the other of the guides of the respective pair of guides and therefore each have a section extending generally vertically between the respective upper and lower guides. Tensioners engage the outer edges of the sheets and maintain the wall sections taut and generally planar between the respective upper and lower guides. Thus the deposition space is transversely delimited by the sections of the sheets.

The sheets according to this invention have very smooth low-friction surfaces confronting each other. This can be achieved by making them of a polytetrafluorethylene sheeting, or of a textile coated with polytetrafluorethylene. Similarly a rubber or rubber-coated fabric or a reinforced synthetic-resin foil can be used. The low-friction surfacing ensures that contact with the particles will not significantly disturb the edges of the mat formed in the deposition space, and the lack of joints between separate wall-defining elements, since the walls of this invention are longitudinally continuous, further reduces the likelihood of spoiling the mat edges.

According to a further feature of this invention the inner edges of the sheets are secured to the upper guides and the sheets pass around and outward from the respective lower guides. Alternately the inner edges of the sheets can be secured to the lower guides and the sheets can pass around and outward from the respective upper guides. The tensioner can include weights suspended from the respective outer edges or can be respective spring-loaded rollers on which the outer edges are wound up.

DESCRIPTION OF THE DRAWING

The above and other objects, features, and advantages will become more readily apparent from the following, it being understood that any feature described with reference to one embodiment of the invention can be used where possible with any other embodiment and that reference numerals or letters not specifically mentioned with reference to one FIGURE but identical to those of another refer to structure that is functionally if not structurally identical. In the accompanying drawing.

SPECIFIC DESCRIPTION

Figure 1:
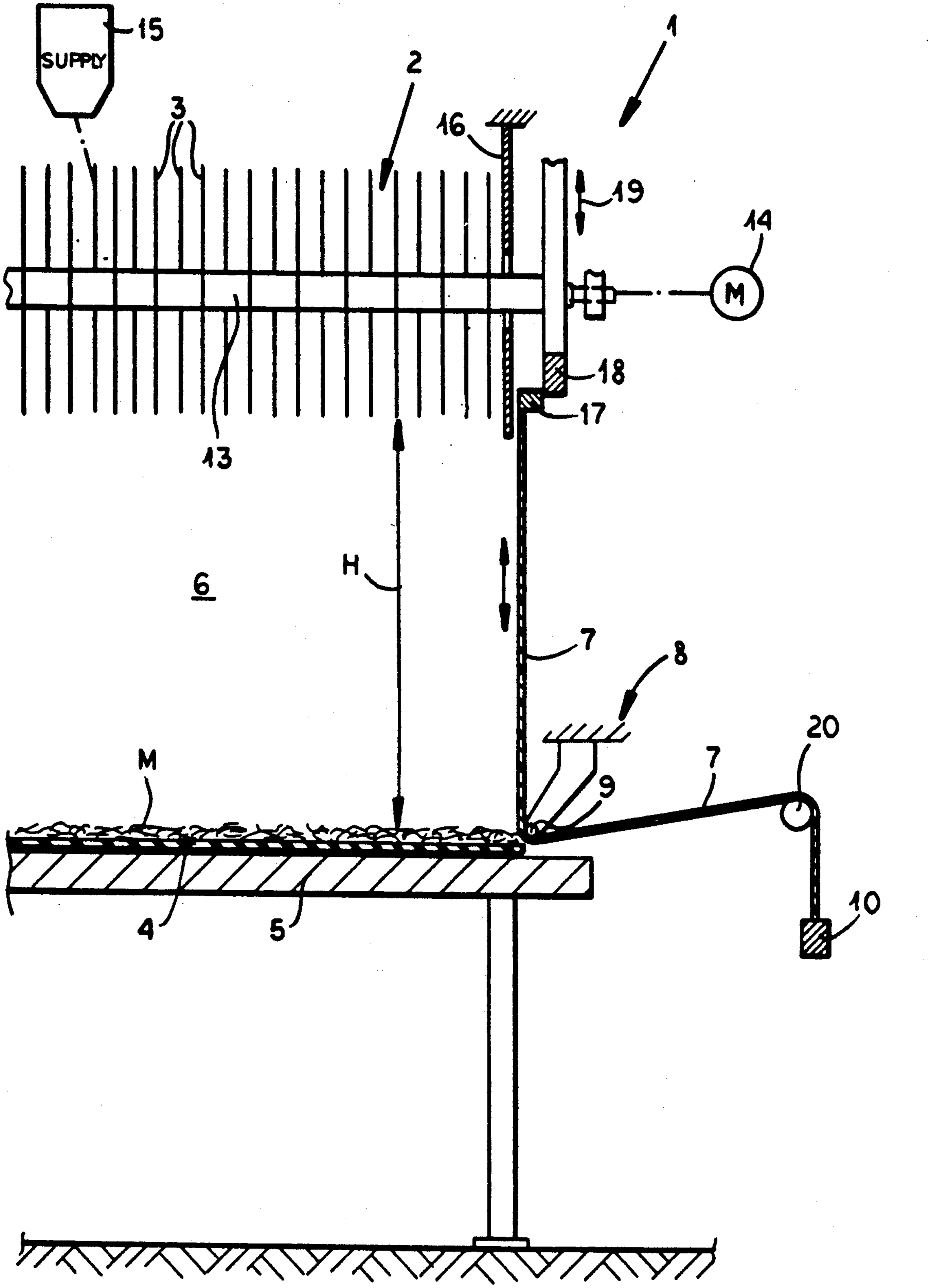
FIG. 1 is a partly diagrammatic vertical cross section through the apparatus of this invention.
Figure 2:
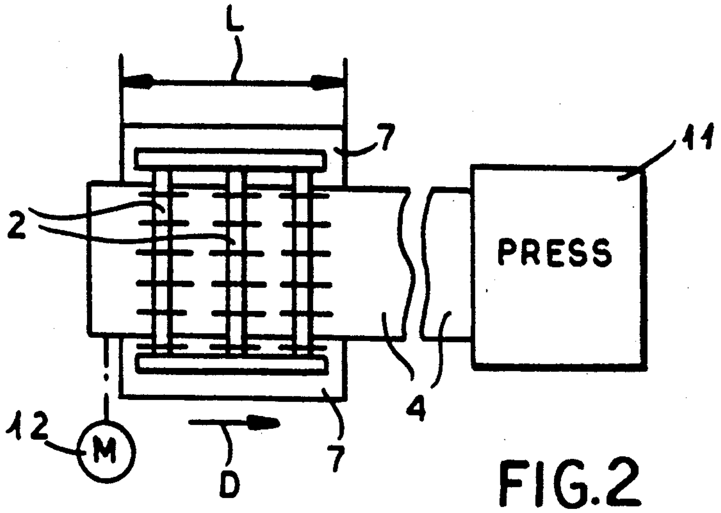
FIG. 2 is a small-scale and largely diagrammatic top view of the apparatus of this invention.

As seen in FIGS. 1 and 2 a mat M for the formation of particleboard in a press 11 is formed on an upper stretch of a conveyor belt 4 running over a table 5 and driven by a motor 12 to move continuously longitudinally in an upstream-to-downstream direction D. A dispensing apparatus 1 provided above the belt 4 defines the upper limit of a deposition space 6 downwardly delimited by the belt 4 and comprises a plurality of dispensing drums or rollers 2 having axially spaced disks 3 mounted on a shaft 13 rotated about its horizontal transverse axis by a motor 14. Particles are fed to the top of the drums 2 from a supply indicated schematically at 15 so as to fall through these drums 2 and form the mat M on the belt 4.

According to this invention the space 6 is horizontally transversely delimited by a pair of walls formed by upright sections of flexible sheets 7. Each of these sheets 7 is of one piece and extends the full longitudinal length L of the space 6. In addition each sheet 7 has an inner edge secured immediately outside a baffle plate 16 to an upper guide 17 fixed to a framework 18 on which the shafts 13 are journaled. The sheets 7 extend downward from the upper guides 17 and pass inside and then under a rod 9 of a lower guide 8, and then over another deflector 20. Finally each sheet 7 has an outer edge that is attached to a weight 10 that maintains tension in the respective sheet 7 and keeps the section forming the side wall of the space 6 planar and taut.

The framework 18 is vertically displaceable as indicated by arrow 19 to vary the height H of the space. As the framework 18 moves up and down, the upper guide 17 moves with it and the weights also move down and up, respectively, to keep the side-wall sheets 7 taut. Thus when the space height H is adjusted there is no need to do anything to the walls defined by the sheets 7; same will automatically adjust themselves and remain taut.

Figure 3:
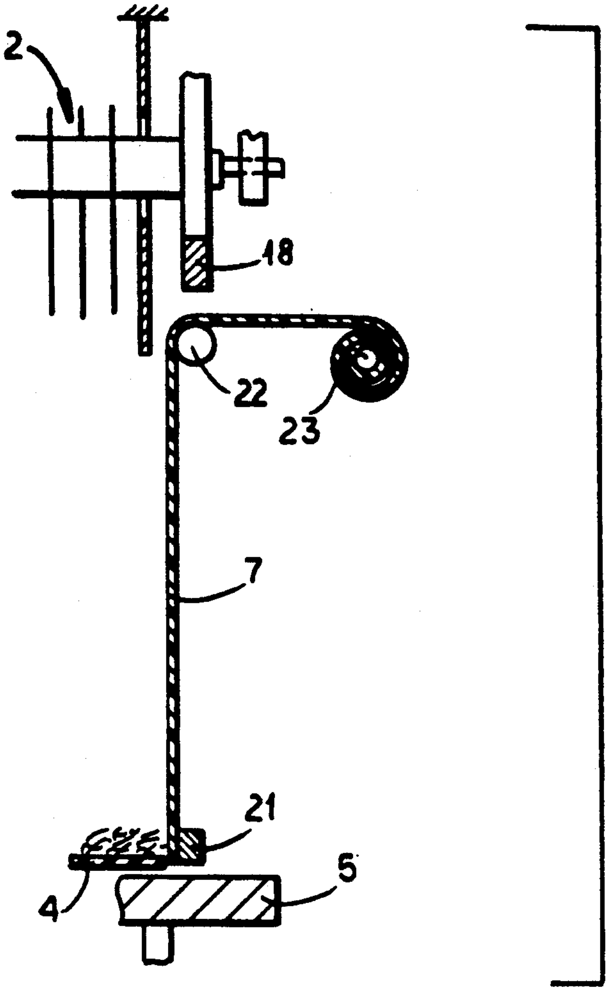
FIG. 3 is a view like FIG. 1 of a detail of a variant of the system of this invention.

FIG. 3 shows how the sheet 7 can be secured at its inner edge to a lower guide 21 extending longitudinally the full length of the space 6 and be deflected over an upper guide 22 secured by unillustrated supports to the framework 18. The outer end of the sheet 7 is wound up on a spring-loaded shade-type roller 23 to keep it taut.

We claim:

1. An apparatus for forming a particle mat for the production of particleboard, the apparatus comprising:
  - a transport belt having a stretch moving in a longitudinal transport direction and forming a deposition surface in turn defining a floor of a deposition space;
  - dispensing means upwardly delimiting the space and including a dispensing roller for depositing particles as a mat in the space on the longitudinally moving deposition surface;
  - a pair of transversely spaced and longitudinally extending upper guides extending generally the full longitudinal length of the pace generally at the dispensing means;
  - a pair of transversely spaced and longitudinally extending lower guides extending generally the full longitudinal length of the space underneath the respective upper guides and generally at the deposition surface;
  - a pair of longitudinally extending, continuous, and transversely spaced flexible one-piece sheets extending the full longitudinal length of the space and each having an inner edge secured to one of the guides of a respective one of the pairs of guides and an outer edge, the sheets each passing around the other of the guides of the respective pair of guides and therefore each having an upright section extending generally vertically between the respective upper and lower guides; and
  - tensioning means engaging the outer edges of the sheets and maintaining the wall sections taut, upright, and generally planar between the respective upper and lower guides, whereby the deposition space is transversely delimited by the sections of the sheets.

2. The mat-forming apparatus defined in claim 1 wherein the inner edges of the sheets are secured to the upper guides and the sheets pass around and outward from the respective lower guides.

3. The mat-forming apparatus defined in claim 1 wherein the inner edges of the sheets are secured to the lower guides and the sheets pass around and outward from the respective upper guides.

4. The mat-forming apparatus defined in claim 1 wherein the tensioning means includes weights suspended from the respective outer edges.

5. The mat-forming apparatus defined in claim 1 wherein the tensioning means includes respective spring-loaded rollers on which the outer edges are wound up.

6. The mat-forming apparatus defined in claim 1 wherein the dispensing roller is rotatable about a horizontal and transversely extending axis above the space and is provided with a plurality of vertical and transversely spaced dispensing disks.

7. The mat-forming apparatus defined in claim 1, further comprising
  - a vertically displaceable support carrying the dispensing roller and both upper guides, whereby the vertical position of the support determines the height of the deposition space.

8. An apparatus for forming a particle mat for the production of particleboard, the apparatus comprising:
  - a transport belt having a stretch moving in a longitudinal and horizontal transport direction and forming a deposition surface in turn defining a floor of a deposition space;
  - vertically displaceable dispensing means upwardly delimiting the space and including a dispensing roller for depositing particles as a mat in the space on the longitudinally moving deposition surface;
  - a pair of transversely spaced and longitudinally extending upper guides extending generally the full longitudinal length of the space generally at the dispensing means, the upper guides flanking and being fixed to the dispensing means for vertical movement jointly therewith;
  - respective transversely spaced and longitudinally extending lower guides extending generally the full longitudinal length of the space underneath the upper guides and generally at the deposition surface;
  - respective longitudinally extending, continuous, and transversely spaced flexible one-piece sheets extending the full longitudinal length of the space, laterally delimiting the space, and each having an inner edge secured to a respective one of the upper guides and an outer edge, the sheets each passing around the respective lower guide and therefore each having an upright section extending generally vertically between the respective upper and lower guides; and tensioning means engaging the outer edges of the sheets and maintaining the wall sections taut, upright, and generally planar between the respective upper and lower guides, whereby the deposition space is transversely delimited by the sections of the sheets.

* * * * *